US011051261B2

(12) United States Patent
Sun

(10) Patent No.: US 11,051,261 B2
(45) Date of Patent: Jun. 29, 2021

(54) METHOD OF SYNCHRONIZING TIME IN WIRELESS MESH NETWORK AND RELATED WIRELESS MESH NETWORK

(71) Applicant: Realtek Semiconductor Corp., HsinChu (TW)

(72) Inventor: Zaiqiang Sun, Shanghai (CN)

(73) Assignee: Realtek Semiconductor Corp., HsinChu (TW)

( * ) Notice: Subject to any disclaimer, the term of this patent is extended or adjusted under 35 U.S.C. 154(b) by 21 days.

(21) Appl. No.: 16/574,100

(22) Filed: Sep. 18, 2019

(65) Prior Publication Data
US 2020/0413355 A1    Dec. 31, 2020

(30) Foreign Application Priority Data

Jun. 26, 2019    (CN) .......................... 201910559779.3

(51) Int. Cl.
*H04W 56/00* (2009.01)
*H04W 76/11* (2018.01)
*H04W 4/80* (2018.01)
*H04W 84/18* (2009.01)

(52) U.S. Cl.
CPC .......... *H04W 56/001* (2013.01); *H04W 4/80* (2018.02); *H04W 76/11* (2018.02); *H04W 84/18* (2013.01)

(58) Field of Classification Search
CPC ..... H04W 56/001; H04W 4/80; H04W 76/11; H04W 84/18
USPC ........................................ 370/310, 328, 329
See application file for complete search history.

(56) References Cited

U.S. PATENT DOCUMENTS

2018/0234920 A1* 8/2018 Bae .................... H04W 52/0225
2019/0053179 A1* 2/2019 Taylor ............... H04W 56/0015

FOREIGN PATENT DOCUMENTS

WO    2018/232569 A1    12/2018

OTHER PUBLICATIONS

Kazuaki Takeda et al., NTT DOCOMO Technical Journal, "New Technologies for Achieving IoT in LTE Release 13", vol. 18 No. 2, Oct. 2016.(https://www.nttdocomo.co.jp/english/corporate/technology/rd/technical_journal/bn/vol18_2/), p. 39-51.

\* cited by examiner

*Primary Examiner* — Obaidul Huq
(74) *Attorney, Agent, or Firm* — Winston Hsu

(57) ABSTRACT

A wireless mesh network includes multiple nodes each implemented with mesh and NB-IoT technologies. Each node performs time synchronization based on an SFN and an H-SFN of a base NB-IoT cell, wherein at least one of the multiple nodes is located in the base NB-IoT cell.

8 Claims, 2 Drawing Sheets

METHOD OF SYNCHRONIZING TIME IN WIRELESS MESH NETWORK AND RELATED WIRELESS MESH NETWORK

CROSS REFERENCE TO RELATED APPLICATION

This application claims priority of China Application No. 201910559779.3 filed on 2019 Jun. 26.

BACKGROUND OF THE INVENTION

1. Field of the Invention

The present invention is related to a method of synchronizing time in a wireless mesh network and related wireless mesh network, and more particularly, to a method of synchronizing time in a wireless mesh network based on an SFN and an H-SFN of a base NB-IoT cell and related wireless mesh network.

2. Description of the Prior Art

With rapid development in network technologies, various wireless networks have been continuously improved to provide better wireless communications. Among them, wireless mesh network (WMN) is one of the emerging technologies aimed at seamlessly connecting the world. A wireless mesh network may be deployed in a region without or not worthy of setting up any wired network in order to provide easy, effective and wireless connection in this region using inexpensive and existing technologies. Characterized in self-organized and self-organized abilities, a wireless mesh network can be easily deployed and maintained.

Each of the plurality of mesh nodes in a mesh network may activate its corresponding sensor so that data measured by multiple sensors at different time may be analyzed. If the plurality of mesh nodes in the mesh network can simultaneously activate respective sensors, the duty cycle of receiving and transmitting data may be reduced, thereby lowering system power consumption. In a prior art mesh network, each mesh node can operate based on the timing signal generated by its internal clock. However, without synchronizing all the mesh nodes in the mesh network, the above-mentioned simultaneous activation cannot be achieved for reducing power consumption.

SUMMARY OF THE INVENTION

The present invention provides a method of synchronization time in a wireless mesh network which includes a plurality of nodes each supporting both a mesh technology and an NB-IoT technology. Each node performs time synchronization based on an SFN and an H-SFN of a base NB-IoT cell, wherein at least one of the plurality of nodes is located in the base NB-IoT cell.

The present invention further provides a method of synchronization time in a wireless mesh network which includes a first through an $M^{th}$ nodes each supporting both a mesh technology and an NB-IoT technology. The first through the $M^{th}$ nodes respectively acquire a first through an $M^{th}$ cell identities associated with a first through an $M^{th}$ NB-IoT cells, wherein the first through the $M^{th}$ nodes are respectively located in the first through the $M^{th}$ NB-IoT cells. The first through the $M^{th}$ nodes respectively broadcast the first through the $M^{th}$ cell identities. The first node acquires an SFN and an H-SFN of a base NB-IoT cell among the first through the $M^{th}$ NB-IoT cells. The first node performs time synchronization based on the SFN and the H-SFN, wherein M is an integer larger than 1.

The present invention further provides a wireless mesh network which includes a plurality of nodes each supporting both a mesh technology and a Narrow Band-Internet of Things (NB-IoT) technology. The plurality of nodes are configured to perform time synchronization based on an SFN and an H-SFN of a base NB-IoT cell, wherein at least one of the plurality of nodes is located in the base NB-IoT cell.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
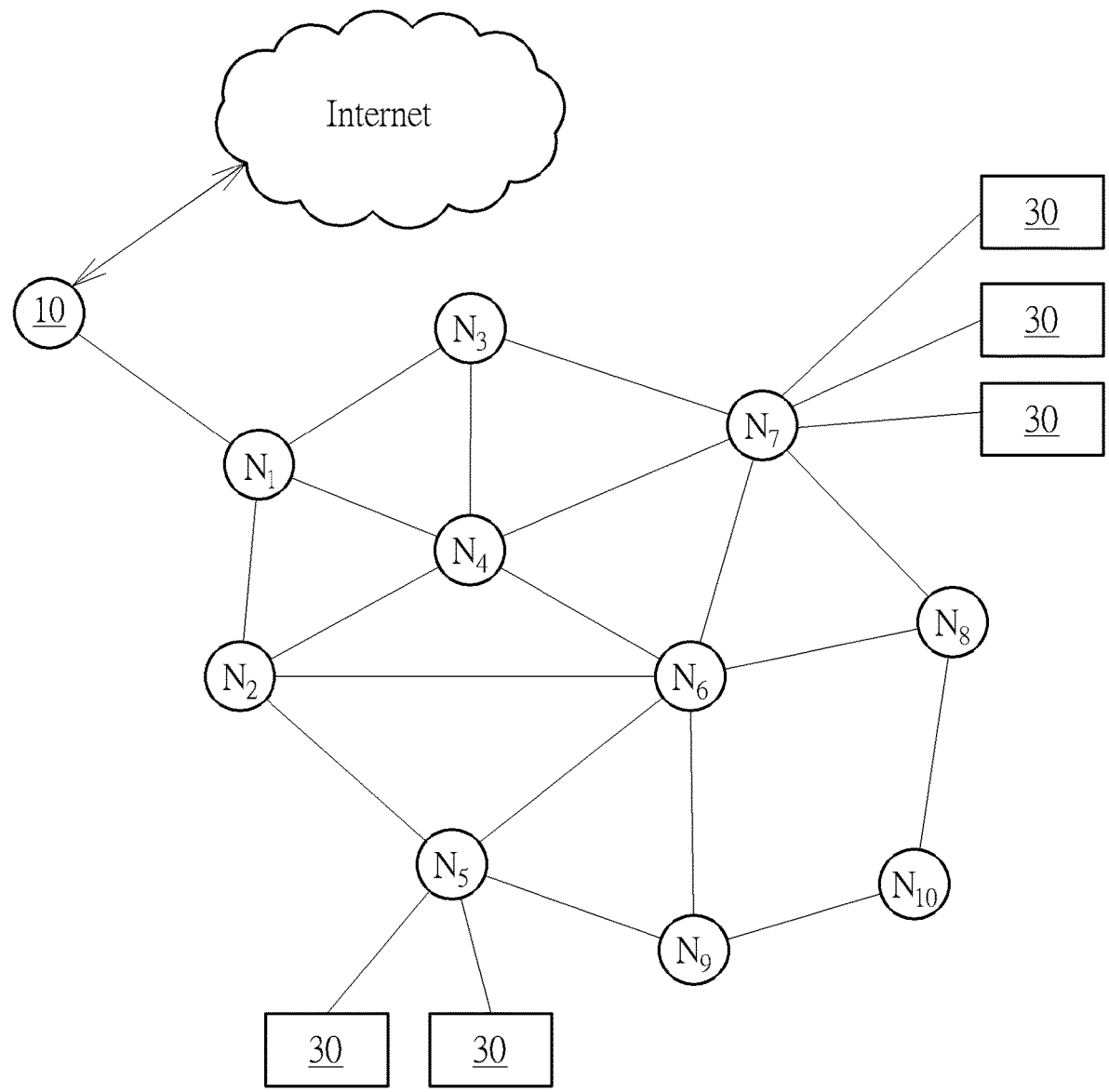
FIG. 1 is a diagram illustrating a wireless mesh network according to an embodiment of the present invention.

FIG. 1 is a diagram illustrating a wireless mesh network 100 according to an embodiment of the present invention. The mesh network 100 includes a mesh portal 10 and a plurality of nodes $N_1 \sim N_M$, wherein M is an integer larger than 1. For illustrative purpose, FIG. 1 depicts the embodiment when M=10. However, the amount of the nodes in the wireless mesh network 100 does not limit the scope of the present invention.

The mesh portal 10 is a gateway between an Internet 20 and the mesh network 100, and configured to provide data routing from the wireless mesh network 100 to the Internet 20 or from the Internet 20 to the wireless mesh network 100. The plurality of nodes $N_1 \sim N_M$ may directly provide wireless Internet access to one or multiple mobile stations 30 using wireless access link.

In the wireless mesh network 100 of the present invention, the nodes $N_1 \sim N_M$ support both the mesh technology and the Narrow Band-Internet of Things (NB-IoT) technology. Each of the nodes $N_1 \sim N_M$ may serve as a data transmitting node, a data receiving node, or a data relay node. When a first node $N_1$ serving as a data transmitting node is located within the coverage range of a second node $N_2$ serving as a data receiving node, a wireless mesh link may be established between these two nodes for data communication. These nodes $N_1 \sim N_M$ and the mesh portal 10 form a mesh distribution system in which the first node $N_1$ serving as a data transmitting node may transmit data to the second node $N_2$ serving as a data relay node, and the second node $N_2$ serving as a data transmitting node may transmit data to the third node $N_3$ serving as a data receiving node.

NB-IoT is a standards-based low power wide area technology developed to enable a wide range of new IoT devices and can be deployed in 3 different modes: in-band, guard-band or stand-alone. NB-IoT systems can co-exist with existing 2G, 3G, and 4G mobile networks and thus benefit from all the security and privacy features of these mobile networks. In an NB-IoT system, the base station is configured to transmit system information to all mobile stations in its cell via broadcast control channel (BCCH). Each mobile station may acquire information including downlink system bandwidth, physical hybrid ARQ indicator channel (PHICH), system frame number (SFN), and cell-specific antenna port. The time unit for synchronizing each mobile station with the base station is hyper system frame number (H-SFN). The length of an SFN is 10 ms and the value of the SFN increases by 1 every 10 ms from 1 to 1023. When the value of the SFN reaches 1023, it restarts from 0, which means each SFN cycle is equal to 10.24 seconds. An H-SFN includes a range of 1-1023 SFNs, which means the maximum period of the H-SFN includes 2014 SFN cycles corresponding to 2.9127 hours. The SFNs and H-SFNs of different NB-IoT cells are not necessarily aligned, but the SFNs and H-SFNs of the same NB-IoT cell are stable. Therefore, by acquiring the SFN and H-SFN variations between different NB-IoT cells, all nodes in these different NB-IoT cells may be synchronized.

Figure 2:
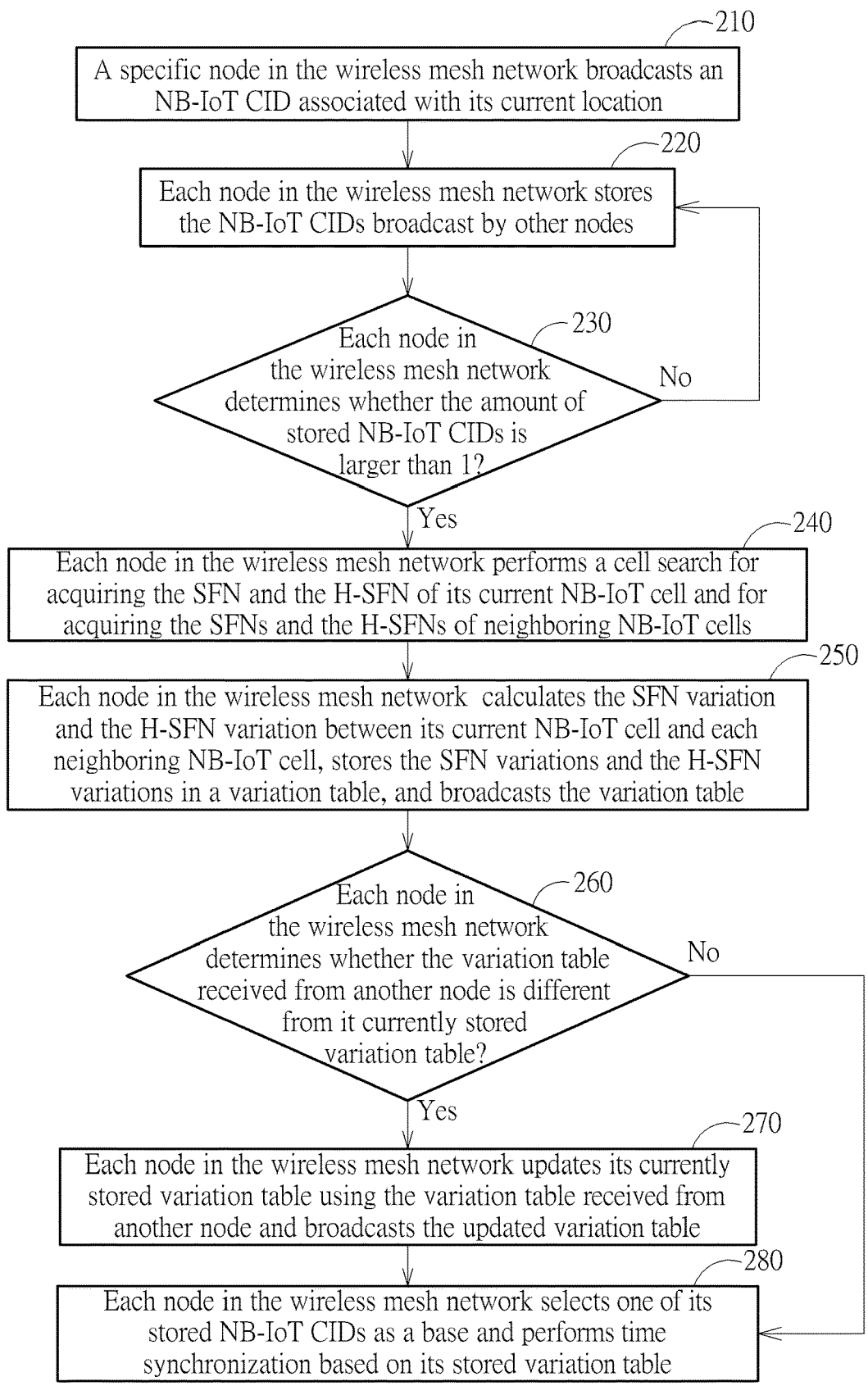
FIG. 2 is a flowchart illustrating a method of synchronization time in a wireless mesh network according to an embodiment of the present invention.

FIG. 2 is a flowchart illustrating a method of synchronization time in the wireless mesh network 100 according to an embodiment of the present invention. The flowchart in FIG. 2 includes the following steps:

Step 210: a specific node in the wireless mesh network 100 broadcasts an NB-IoT cell identity (CID) associated with its current location; execute step 220.

Step 220: each node in the wireless mesh network 100 stores the NB-IoT CIDs broadcast by other nodes; execute step 230.

Step 230: each node in the wireless mesh network 100 determines whether the amount of stored NB-IoT CIDs is larger than 1; if yes, execute step 240; if no, execute step 220.

Step 240: each node in the wireless mesh network 100 performs a cell search for acquiring the SFN and the H-SFN of its current NB-IoT cell and for acquiring the SFNs and the H-SFNs of neighboring NB-IoT cells; execute step 250.

Step 250: each node in the wireless mesh network 100 calculates the SFN variation and the H-SFN variation between its current NB-IoT cell and each neighboring NB-IoT cell, stores the SFN variations and the H-SFN variations in a variation table, and broadcasts the variation table; execute step 260.

Step 260: each node in the wireless mesh network 100 determines whether the variation table received from another node is different from it currently stored variation table; if yes, execute step 270; if no, execute step 280.

Step 270: each node in the wireless mesh network 100 updates its currently stored variation table using the variation table received from another node and broadcasts the updated variation table; execute step 280.

Step 280: each node in the wireless mesh network 100 selects one of its stored NB-IoT CIDs as a base and performs time synchronization based on its stored variation table; execute step 220.

In step 210, the specific node in the wireless mesh network 100 is configured to broadcast the NB-IoT CID associated with its current location. In an embodiment, the specific node may be a newly-added node of the wireless mesh network 100. More specifically, when the specific node is added to the wireless mesh network 100, it broadcasts the NB-IoT CID associated with its current location to other existing nodes in the wireless mesh network 100.

In step 220, each node in the wireless mesh network 100 is configured to receive and store the NB-IoT CIDs broadcast by other nodes. In an embodiment, each node may store the NB-IoT CIDs broadcast by other nodes in the form depicted by the following Table 1. In Table 1, $CID_1 \sim CID_N$ represent NB-IoT CIDs (N is a positive integer) which may be sorted by value, such as $CID_1 < CID_2 < \ldots < CID_N$.

$NUM_1 \sim NUM_N$ respectively represent the amount of nodes located in different NB-IoT cells (associated with $CID_1 \sim CID_N$).

TABLE 1

| NB-IoT cell identity | Amount of nodes |
|---|---|
| $CID_1$ | $NUM_1$ |
| $CID_2$ | $NUM_2$ |
| . | . |
| . | . |
| . | . |
| $CID_N$ | $NUM_N$ |

In step 230, each node in the wireless mesh network 100 is configured to determine whether the amount of stored NB-IoT CIDs is larger than 1. If the amount of stored NB-IoT CIDs is larger than 1, each node in the wireless mesh network 100 is configured to perform a cell search for acquiring the SFN and the H-SFN of its current NB-IoT cell and for acquiring the SFNs and the H-SFNs of neighboring NB-IoT cells in step 240.

In step 250, each node in the wireless mesh network 100 is configured to calculate the SFN variation and the H-SFN variation between its current NB-IoT cell and each neighboring NB-IoT cell, store the SFN variations and the H-SFN variations in the variation table, and broadcast the variation table. In an embodiment assuming that a node is located in the NB-IoT cell associated with $CID_1$, the node may store the SFN variations and the H-SFN variations in the variation table as depicted in the following Table 2.

TABLE 2

| NB-IoT cell identity | H-SFN variation | SFN variation |
|---|---|---|
| $CID_1$ | 0 | 0 |
| $CID_2$ | −23 | +104 |
| . | . | . |
| . | . | . |
| . | . | . |
| $CID_N$ | 10 | −50 |

In step 260, each node in the wireless mesh network 100 is configured to determine whether the variation table received from another node is different from it currently stored variation table. If the variation table received from another node is different from its currently stored variation table, each node in the wireless mesh network 100 is configured to update it currently stored variation table using the variation table received from another node and broadcast the updated variation table in step 270. If the variation table received from another node is the same as it currently stored variation table, each node in the wireless mesh network 100 is configured to keep its currently stored variation table without further broadcasting it.

In step 280, each node in the wireless mesh network 100 is configured to select one of its stored NB-IoT CIDs as abase and perform time synchronization based on its stored variation table. In an embodiment, each node in the wireless mesh network 100 may select one of its stored NB-IoT CIDs corresponding to the largest amount of nodes as the base. In other words, the NB-IoT cell associated with the NB-IoT CID having the largest value among $NUM_1 \sim NUM_M$ may be selected as the base NB-IoT cell for performing time synchronization.

In conclusion, the present invention provides a wireless mesh network which includes a plurality of nodes each supporting both the mesh technology and the NB-IoT technology. The plurality of nodes may perform time synchronization based on the SFN and the H-SFN of a base NB-IoT cell. Each of the plurality of nodes in the present wireless mesh network may activate its corresponding sensor so that data measured by multiple sensors at different time may be analyzed. Also, the plurality of nodes in the present wireless mesh network can simultaneously activate respective sensors so that the duty cycle of receiving and transmitting data may be reduced, thereby lowering system power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of synchronization time in a wireless mesh network which includes a plurality of nodes each supporting both a mesh technology and a Narrow Band-Internet of Things (NB-IoT) technology, the method comprising:
   a first node among the plurality of nodes acquiring a first cell identity of a first NB-IoT cell, wherein the first node is located in the first NB-IoT cell;
   the first node broadcasting the first cell identity;
   a second node among the plurality of nodes acquiring a second cell identity of a second NB-IoT cell, wherein the second node is located in the second NB-IoT cell;
   the second node determining whether both the first NB-IoT cell and the second NB-IoT cell are a base NB-IoT cell according to the first cell identity and the second cell identity; and
   the second node performing time synchronization based on a system frame number (SFN) and a hyper system frame number (H-SFN) of the base NB-IoT cell when determining that both the first NB-IoT cell and the second NB-IoT cell are the base NB-IoT cell, wherein at least one of the plurality of nodes is located in the base NB-IoT cell.

2. The method of claim 1, further comprising:
   the second node selecting one of the first NB-IoT cell and the second NB-IoT cell as the base NB-IoT cell when determining that at least one of the first NB-IoT cell and the second NB-IoT cell is not the base NB-IoT cell.

3. The method of claim 2, further comprising:
   the second node performing a cell search for acquiring a first SFN and a first H-SFN of the first NB-IoT cell and for acquiring a second SFN and a second H-SFN of the second NB-IoT cell;
   the second node calculating a first variation between the first SFN and the second SFN and calculating a second variation between the first H-SFN and the second H-SFN; and
   the second node broadcasting the first variation and the second variation.

4. The method of claim 3, further comprising:
   the second node selecting the second NB-IoT cell as the base NB-IoT cell when determining that at least one of the first NB-IoT cell and the second NB-IoT cell is not the base NB-IoT cell; and
   the second node performing time synchronization based on the first variation and the second variation.

5. A method of synchronization time in a wireless mesh network which includes a first through an $M^{th}$ nodes each supporting both a mesh technology and a Narrow Band-Internet of Things (NB-IoT) technology, the method comprising:
   the first through the $M^{th}$ nodes respectively acquiring a first through an $M^{th}$ cell identities associated with a first through an $M^{th}$ NB-IoT cells, wherein the first through the $M^{th}$ nodes are respectively located in the first through the $M^{th}$ NB-IoT cells;
   the first through the $M^{th}$ nodes respectively broadcasting the first through the $M^{th}$ cell identities;
   the first node acquiring an SFN and an H-SFN of a base NB-IoT cell among the first through the $M^{th}$ NB-IoT cells; and
   the first node performing time synchronization based on the SFN and the H-SFN, wherein M is an integer larger than 1.

6. The method of claim 5, further comprising:
   the first node determining whether the first through the $M^{th}$ nodes are all located in a same NB-IoT cell according to the first cell identity and the second through the $M^{th}$ cell identities respectively received from the second through the $M^{th}$ nodes; and
   the first node performing time synchronization based on the SFN and the H-SFN when determining that the first through the $M^{th}$ nodes are all located in the base NB-IoT cell.

7. The method of claim 5, further comprising:
   the first node determining whether the first through the $M^{th}$ nodes are all located in a same NB-IoT cell according to the first cell identity and the second through the $M^{th}$ cell identities respectively received from the second through the $M^{th}$ nodes;
   the first node selecting one of the first through the $M^{th}$ NB-IoT cells which includes a largest amount of nodes as the base NB-IoT cell according to the first through the $M^{th}$ NB-IoT cell identities when determining that the first through the $M^{th}$ node are not all located in the same NB-IoT cell; and
   the first node performing time synchronization based on the SFN and the H-SFN.

8. A wireless mesh network, comprising:
   a plurality of nodes each supporting both a mesh technology and a Narrow Band-Internet of Things (NB-IoT) technology, and configured to perform time synchronization based on a system frame number (SFN) and a hyper system frame number (H-SFN) of a base NB-IoT cell, wherein:
      at least one of the plurality of nodes is located in the base NB-IoT cell;
      a first node among the plurality of nodes is located in a first NB-IoT cell;
      a second node among the plurality of nodes is located in a second NB-IoT cell; and
      the first node and the second node are configured to perform time synchronization based on the SFN and the H-SFN when both the first NB-IoT cell and the second NB-IoT cell are the base NB-IoT cell.

* * * * *